(12) United States Patent
Mitsutani

(10) Patent No.: US 11,518,244 B2
(45) Date of Patent: Dec. 6, 2022

(54) DEMAND AND SUPPLY CONTROL SYSTEM FOR VEHICLE

(71) Applicant: TOYOTA JIDOSHA KABUSHIKI KAISHA, Toyota (JP)

(72) Inventor: Noritake Mitsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 16/832,016

(22) Filed: Mar. 27, 2020

(65) Prior Publication Data

US 2020/0353837 A1 Nov. 12, 2020

(30) Foreign Application Priority Data

May 10, 2019 (JP) .............................. JP2019-089655

(51) Int. Cl.
| | | |
|---|---|---|
| B60L 1/00 | (2006.01) | |
| B60L 53/68 | (2019.01) | |
| B60L 50/60 | (2019.01) | |
| H02J 7/02 | (2016.01) | |
| B60L 53/62 | (2019.01) | |
| B60L 53/10 | (2019.01) | |
| H02J 7/00 | (2006.01) | |
| B60L 53/14 | (2019.01) | |

(52) U.S. Cl.
CPC ................ B60L 1/00 (2013.01); B60L 50/66 (2019.02); B60L 53/10 (2019.02); B60L 53/62 (2019.02); B60L 53/68 (2019.02); H02J 7/0047 (2013.01); H02J 7/02 (2013.01); B60L 53/14 (2019.02)

(58) Field of Classification Search
CPC . H02J 7/0047; H02J 7/02; B60L 53/14; B60L 1/00; B60L 53/68; B60L 50/66; B60L 53/62; B60L 53/10; Y02T 90/12–16
USPC .................................... 307/9.1, 10.1; 702/22
See application file for complete search history.

(56) References Cited

U.S. PATENT DOCUMENTS

| | | |
|---|---|---|
| 5,656,916 A | 8/1997 | Hotta |
| 5,845,221 A | 12/1998 | Hosokawa et al. |
| 2019/0366872 A1* | 12/2019 | Kanamori ............... H02J 1/106 |
| 2020/0001720 A1* | 1/2020 | Pighi ....................... B60L 50/10 |
| 2022/0153138 A1* | 5/2022 | Dalum .................... B60L 58/12 |

FOREIGN PATENT DOCUMENTS

| | | |
|---|---|---|
| JP | H05-147420 A | 6/1993 |
| JP | H08-065816 A | 3/1996 |
| JP | H09-019055 A | 1/1997 |
| JP | 2004-194495 A | 7/2004 |
| JP | 2007-307957 A | 11/2007 |
| JP | 2016-052189 A | 4/2016 |

* cited by examiner

Primary Examiner — Rexford N Barnie
Assistant Examiner — Swarna N Chowdhuri
(74) Attorney, Agent, or Firm — Oliff PLC

(57) ABSTRACT

A control device that controls an in-vehicle battery and a charger in a demand and supply control system is configured to obtain total demand for electric power or the like generated in in-vehicle equipment, determine whether or not the total demand is able to be satisfied with electric power or the like suppliable from the in-vehicle battery, when the total demand is not able to be satisfied solely with the in-vehicle battery, and bring the charger into a drive state in a case where the total demand is able to be satisfied with total electric power or the like suppliable from the in-vehicle battery and the charger.

3 Claims, 15 Drawing Sheets

FIG. 2

| PRIORITY RANK | CATEGORY | | DEMAND REQUIREMENT | SUPPLY REQUIREMENT, STORAGE REQUIREMENT |
|---|---|---|---|---|
| P1 | SAFETY | | | |
| P2 | SECURITY | | | |
| P3 | COMPLIANCE | | | |
| | 1 | REGULATION (EXHAUST GAS) | | |
| | 2 | SPECIFICATION (FUEL EFFICIENCY) | | |
| P4 | BASIC PERFORMANCE | | | |
| | SYSTEM START<br>NORMAL TRAVELING | | | |
| P5 | PART PROTECTION | | | |
| | 1 | FAILURE AVOIDANCE (FUNCTION PROTECTION) | | |
| | 2 | DETERIORATION AVOIDANCE (LIFETIME MAINTENANCE) | | |
| P6 | MARKETABILITY | | | |
| | POWER<br>QUIETNESS<br>TRAVELING STABILITY<br>AUTHENTICATED FUEL EFFICIENCY<br>ADVANCED EQUIPMENT | | | |
| P7 | ECONOMICAL EFFICIENCY | | | |
| | 1 | FUEL CONSUMPTION | | |
| | 2 | EV DISTANCE | | |
| | 3 | ELECTRICITY CHARGE | | |
| | 4 | ACCESSORY PROLONGATION | | |
| P8 | VALUE ADDED | | | |

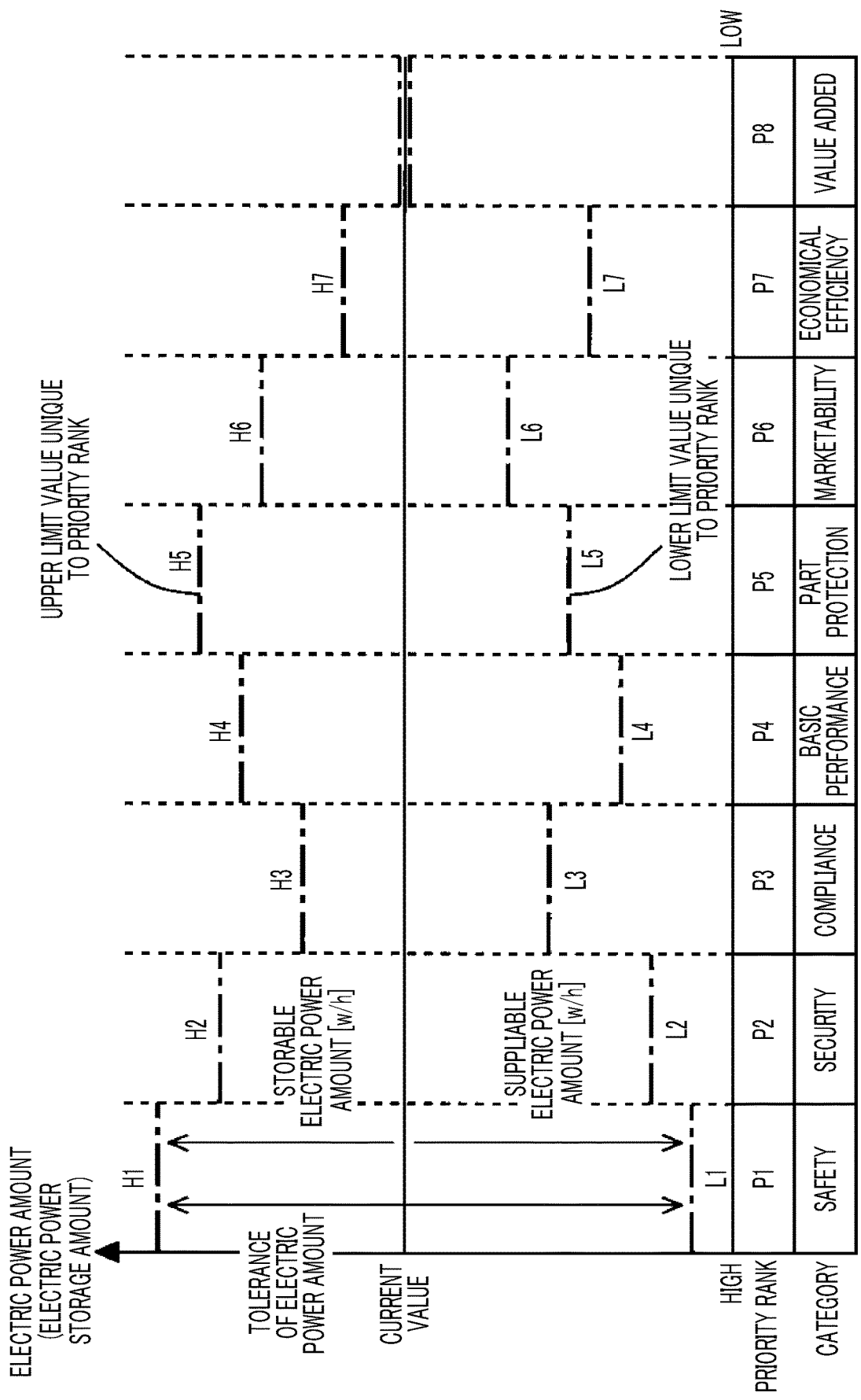

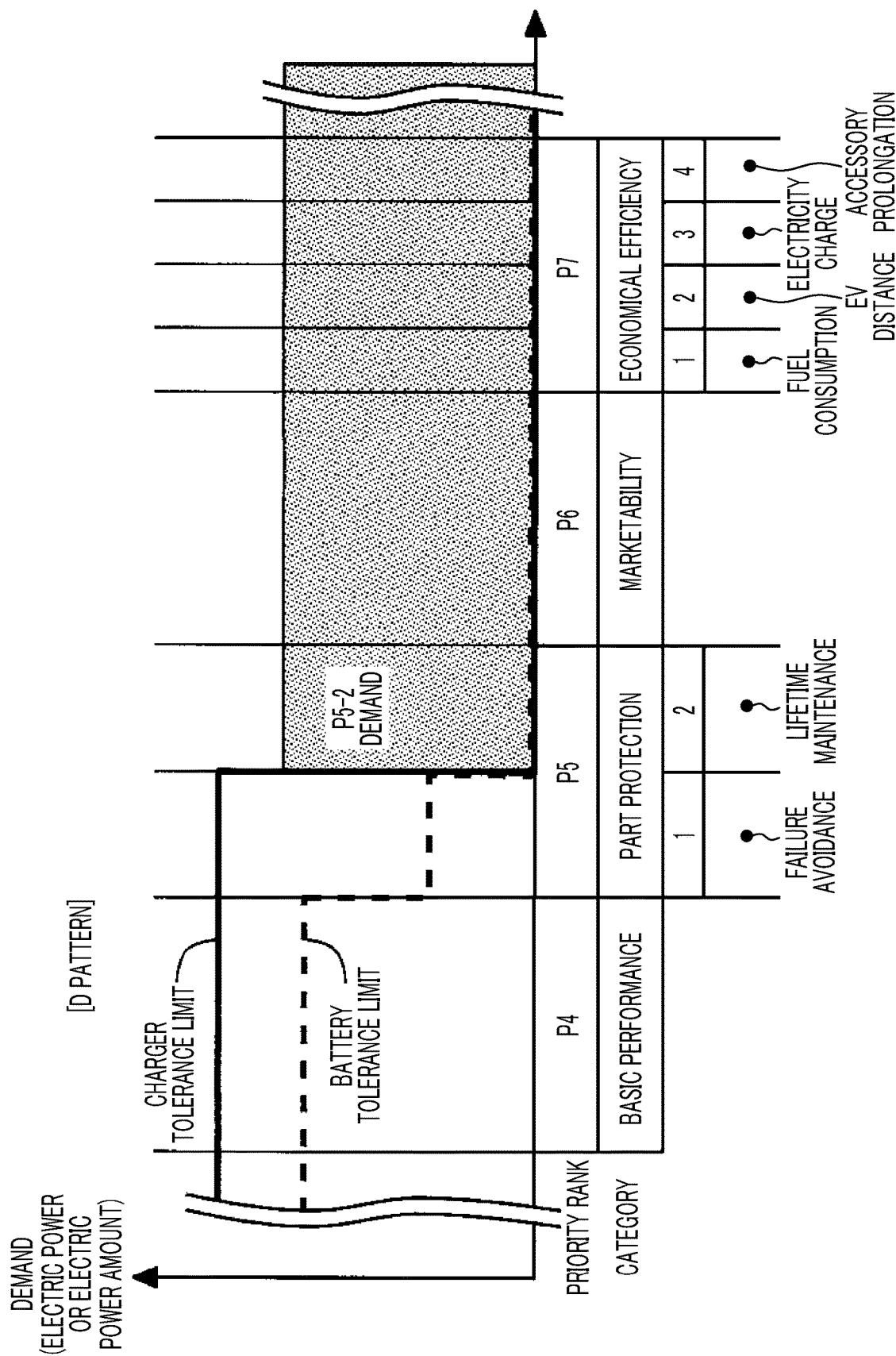

DEMAND AND SUPPLY CONTROL SYSTEM FOR VEHICLE

INCORPORATION BY REFERENCE

The disclosure of Japanese Patent Application No. 2019-089655 filed on May 10, 2019 including the specification, drawings and abstract is incorporated herein by reference in its entirety.

BACKGROUND

1. Technical Field

The present disclosure relates to a demand and supply control system that is mounted in a vehicle and controls demand and supply of electric power or an electric power amount in the vehicle.

2. Description of Related Art

As a system that controls demand and supply of electric power or an electric power amount in a vehicle, Japanese Unexamined Patent Application Publication No. 2007-307957 (JP 2007-307957 A) discloses a device that controls air-conditioning (an air conditioner or a blower) of a parked vehicle based on an electric power generation amount of an in-vehicle solar panel and an electric power storage amount of an in-vehicle battery. In the system, as air-conditioning of the vehicle is controlled when the electric power generation amount of the in-vehicle solar panel is greater than a predetermined value, or when there is a margin in the electric power storage amount of the in-vehicle battery, the inside of a vehicle cabin is controlled comfortably while a shortage of the electric power storage amount of the in-vehicle battery is restrained.

Japanese Unexamined Patent Application Publication No. 2016-052189 (JP 2016-052189 A) discloses a system that controls electric power transfer from a battery for drive to an accessory battery during parking of a vehicle based on an electric power storage amount of the battery for drive and an electric power storage amount of the accessory battery. In the system, when the electric power storage amount of the accessory battery decreases to a threshold value during parking, when the electric power storage amount of the battery for drive is equal to or greater than a predetermined value, the accessory battery is charged with electric power of the battery for drive to restrain accessory battery exhaustion.

SUMMARY

In recent years, a hybrid vehicle or an electric vehicle including a charger connected to an external electric power supply, such as charging equipment, to charge the in-vehicle battery and to supply electric power to in-vehicle equipment has been developed. The external electric power supply can stably and continuously output large electric power compared to a solar electric power generation device. However, suitable demand and supply control of electric power or the electric power amount when an external electric power supply connected through a charger is used in combination with an in-vehicle battery as an electric power supply source has not been examined hitherto.

The disclosure provides a demand and supply control system for a vehicle capable of suitably using electric power or an electric power amount to be supplied from a charger connected to an external electric power supply with respect to demand for electric power or an electric power amount generated in a vehicle.

An aspect of the disclosure relates to a demand and supply control system for a vehicle that is mounted in a vehicle and controls demand and supply of electric power or an electric power amount in the vehicle. The demand and supply control system includes an in-vehicle battery, a charger, and a control device. The charger is configured to perform supply of electric power from an external electric power supply connected to the charger to one or more pieces of in-vehicle equipment. The control device is configured to control the in-vehicle battery and the charger. The control device is configured to obtain total demand as a sum of demand for electric power or an electric power amount generated in the one or more pieces of in-vehicle equipment during parking, determine whether or not the total demand is able to be satisfied with electric power or an electric power amount suppliable from the in-vehicle battery, and when the total demand is not able to be satisfied solely with the in-vehicle battery, control the charger to a drive state when the total demand is able to be satisfied with total electric power or a total electric power amount suppliable from the in-vehicle battery and the charger.

With the demand and supply control system for a vehicle of the disclosure, it is possible to suitably use electric power or the electric power amount supplied from the charger connected to the external electric power supply with respect to demand for electric power or the electric power amount generated in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is an example of definition of a priority rank;

FIG. 3A is an example of a lower limit value and an upper limit value at each priority rank relating to an electric power amount;

FIG. 13 is a diagram (D pattern) illustrating the relationship between the tolerance limits of the high-voltage battery and the plug-in charger and the total demand.

DETAILED DESCRIPTION OF EMBODIMENTS

Figure 1:
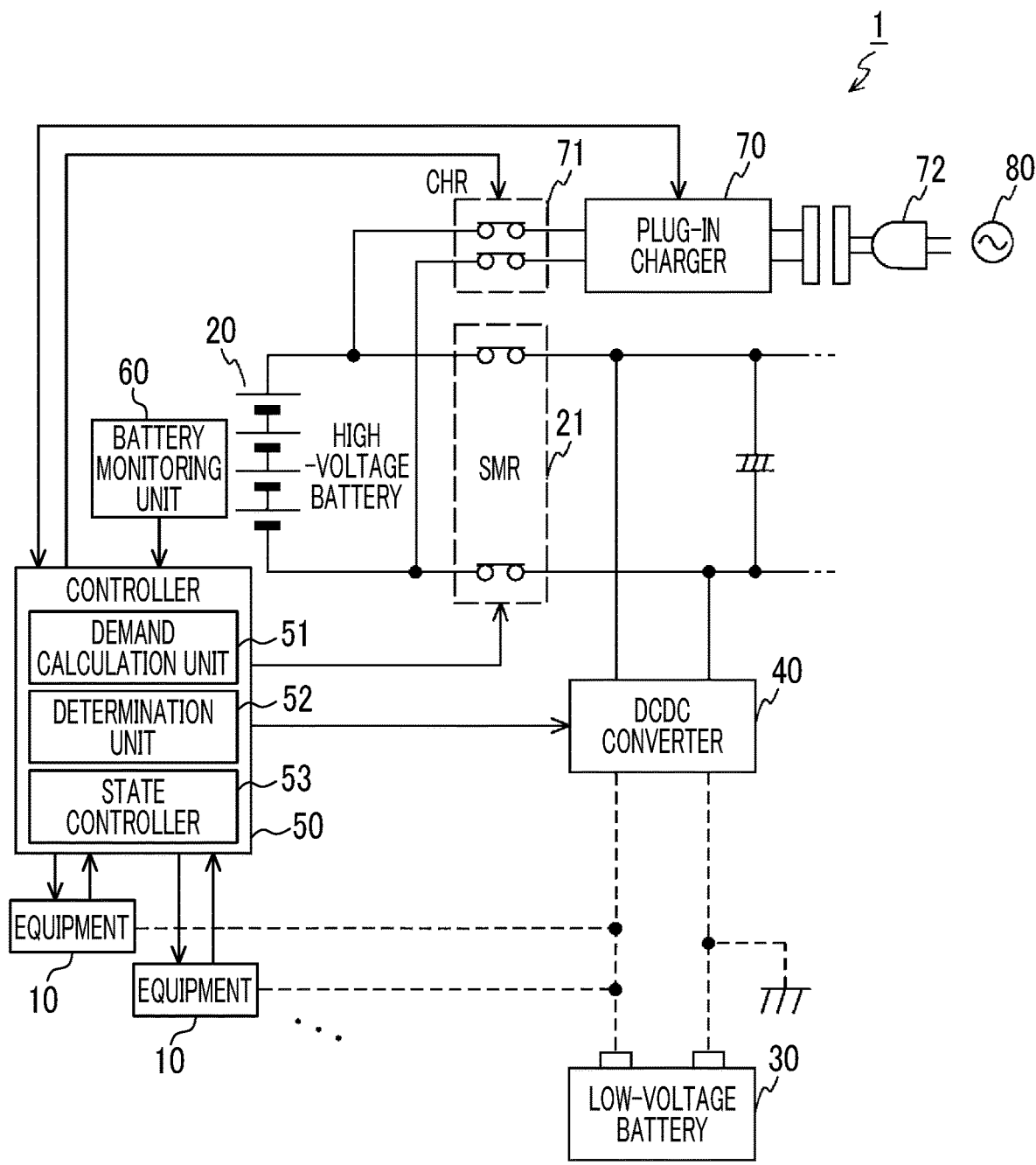
FIG. 1 is a schematic configuration diagram of a demand and supply control system for a vehicle according to an embodiment of the disclosure.

A demand and supply control system for a vehicle of the disclosure is mounted with a charger that is connectable to an external electric power supply. In the present system, when an in-vehicle battery and an external electric power supply to be connected through a charger can be used in combination as an electric power supply source that supplies electric power or the like to in-vehicle equipment, a drive state or a stop state of the charger are controlled such that the in-vehicle battery and the charger are operated efficiently in the system.

Embodiment

Hereinafter, an embodiment of the disclosure will be described in detail referring to the drawings. In the following description, although electric power and an electric power amount are in principle expressed in distinction from each other, when a content can take both of electric power and the electric power amount, the content is expressed using the term "electric power or the like".

Configuration

FIG. 1 is a block diagram showing the schematic configuration of a demand and supply control system 1 for a vehicle according to an embodiment of the disclosure. The demand and supply control system 1 for a vehicle illustrated in FIG. 1 includes a plurality of pieces of equipment 10, a high-voltage battery 20, a low-voltage battery 30, a DCDC converter 40, a controller 50, a battery monitoring unit 60, and a plug-in charger 70.

The pieces of equipment 10 are equipment mounted in the vehicle, and are devices that cause demand (electric power demand) to use electric power needed for performing a predetermined operation or demand (electric power amount demand) to consume a needed electric power amount. The electric power demand may include demand to discharge electric power generated in the equipment 10 to a battery, and the electric power amount demand may include demand to store the electric power amount obtained in the equipment 10 in the battery. In FIG. 1, although an example where two pieces of equipment 10 are mounted in the vehicle is shown, three or more pieces of equipment 10 may be mounted in the vehicle.

The high-voltage battery 20 is a secondary battery configured to charge and discharge electric power, such as a lithium-ion battery, and is, for example, a battery for drive mounted in the vehicle as a supply and storage source of electric power or the like. The high-voltage battery 20 can supply electric power or the like to a starter motor, a motor for traveling, and the like (not shown) through a system main relay (SMR) 21. The high-voltage battery 20 can output electric power or the like to the DCDC converter 40 through the SMR 21.

The battery monitoring unit 60 monitors a status (voltage, current balance, temperature, electric power storage amount, and the like) of the high-voltage battery 20. The battery monitoring unit 60 transmits the status of the high-voltage battery 20 to be monitored to the controller 50 at any time.

The plug-in charger 70 can be connected to a predetermined external electric power supply 80 through a connection plug 72. When the plug-in charger 70 is connected to the external electric power supply 80 through the connection plug 72, the plug-in charger 70 can supply electric power or the like to the high-voltage battery 20 through a charge relay (CHR) 71. The plug-in charger 70 can output electric power or the like to the starter motor, the motor for traveling, and the like, and DCDC converter 40 through the CHR 71 and the SMR 21.

The low-voltage battery 30 is a secondary battery configured to charge and discharge electric power, such as a lead storage battery or a lithium-ion battery, and is, for example, an accessory battery mounted in the vehicle as a supply and storage source of electric power or the like. The low-voltage battery 30 can store electric power or the like output from the high-voltage battery 20 or the plug-in charger 70. The low-voltage battery 30 may supply electric power or the like stored therein to the pieces of equipment 10.

The DCDC converter 40 can output electric power or the like stored in the high-voltage battery 20 or electric power or the like supplied from the plug-in charger 70 to the pieces of equipment 10 and the low-voltage battery 30 at a predetermined voltage. The DCDC converter 40 can output electric power or the like discharged from the pieces of equipment 10 to the high-voltage battery 20 at a predetermined voltage. Electric power or the like output from the DCDC converter 40 is controlled by an output voltage value instructed from the controller 50.

The controller 50 can control the pieces of equipment 10, the DCDC converter 40, the SMR 21, the plug-in charger 70, and the CHR 71 based on the status of the high-voltage battery 20 input from the battery monitoring unit 60 and a suppliability state of the external electric power supply 80 input from the plug-in charger 70. The suppliability state of the external electric power supply 80 includes at least information regarding a connection state of the external electric power supply 80 and the connection plug 72 or a power supply voltage and a rated current of the external electric power supply 80. The controller 50 receives a control pilot signal (CPLT signal) including the above-described information from the plug-in charger 70, thereby being able to acquire the suppliability state of the external electric power supply 80. The controller 50 of the embodiment executes control for allocating electric power or an electric power amount to be supplied from the supply and storage source with respect to demand for electric power and the like generated in the pieces of equipment 10 to the pieces of equipment 10 in a descending order of a priority rank described below or suitably controls whether or not to use the plug-in charger 70 in addition to the high-voltage battery 20.

The controller 50 may be typically constituted as an electronic control unit (ECU) including a processor, a memory, an input/output interface, and the like. In the controller 50, a part or all of ECUs mounted in the vehicle, such as an ECU capable of controlling a connection and cutoff state of the SMR 21 and the CHR 71, an ECU capable of controlling the output voltage value of the DCDC converter 40, an ECU capable of monitoring the status of the low-voltage battery 30, and an ECU capable of controlling an operation state of the plug-in charger 70, can be included. The controller 50 of the embodiment implements the respective functions of a demand calculation unit 51, a determination unit 52, and a state controller 53 by the processor reading and executing a program stored in the memory.

The demand calculation unit 51 calculates total demand as a sum of demand for electric power and the like generated in the pieces of equipment 10. Various kinds of demand for electric power and the like to be generated in the vehicle are classified as demand requirements of any priority ranks according to contents or purposes. In each priority rank, a supply requirement relating to what extent supply of electric power and the like is permitted with respect to demand for electric power and the like and a storage requirement relating to what extent storage of electric power and the like is permitted with respect to demand for electric power and the like are specified in advance. Hereinafter, the priority rank will be described.

The priority rank defines in advance priority for supplying electric power and the like from at least the high-voltage battery 20 or the plug-in charger 70 with respect to demand for electric power and the like generated in the pieces of equipment 10 based on a predetermined category classified by a function, performance, or the like requested for the vehicle. FIG. 2 shows an example of priority ranks defined based on categories relating to the vehicle.

In the example of FIG. 2, for categories of safety, security, compliance, basic performance (system start, normal traveling), part protection, marketability (power, quietness, traveling stability, authenticated fuel efficiency, advanced equipment), economical efficiency, and value added relating to the vehicle, priority ranks of "P1" with the highest priority to "P8" with the lowest priority are defined, respectively. In the compliance, priority ranks "P3-1" and "P3-2" are further divided for regulation (exhaust gas) and specification (fuel efficiency) as subcategories. In the part protection, priority ranks "P5-1" and "P5-2" are further divided for failure avoidance (function protection) and deterioration avoidance (lifetime maintenance) as subcategories. In the economical efficiency, priority ranks "P7-1", "P7-2", "P7-3", and "P7-4" are further divided for fuel consumption, EV distance, electricity charge, and accessory prolongation as subcategories. The number of priority ranks, division of categories and subcategories, and the like can be freely set based on performance, functions, or the like requested for the vehicle.

In each priority rank, a tolerance limit indicating a limit of permitting supply of electric power and the like from the supply and storage source with respect to demand for electric power and the like is set. In setting the tolerance limit, first, in each priority rank alone, a lower limit value of electric power and the like for permitting a descent when the supply of electric power and the like from the supply and storage source is performed with respect to demand for electric power and the like, and an upper limit value of electric power and the like for permitting an ascent when the storage of electric power in the supply and storage source is performed are obtained. FIG. 3A shows an example of the upper limit value and the lower limit value of an electric power amount to be permitted by the high-voltage battery 20 with respect to demand of each priority rank.

The example of FIG. 3A shows that, when an electric power amount stored in the high-voltage battery 20 is a current value (solid line), in regard to the electric power amount demand of the priority rank P1, the electric power amount (absolute value) until the current value becomes a lower limit value L1 unique to P1 can be supplied with respect to demand of the priority rank alone (supply limit), and an electric power amount (absolute value) until the current value becomes an upper limit value H1 unique to P1 can be stored with respect to demand of the priority rank alone (storage limit). That is, in regard to the electric power amount demand of the priority rank P1 alone, change in electric power amount in a range of the lower limit value L1 to the upper limit value H1 is permitted in order to satisfy a predetermined content relating to safety. Similarly, in regard to the electric power amount demand of the priority rank P2 alone, change in electric power amount in a range of a lower limit value L2 to an upper limit value H2 is permitted in order to satisfy a predetermined content relating to security. In regard to the electric power amount demand of the priority rank P3 alone, change in electric power amount in a range of a lower limit value L3 to an upper limit value H3 is permitted in order to satisfy a predetermined content relating to compliance. In regard to the electric power amount demand of the priority rank P4 alone, change in electric power amount in a range of a lower limit value L4 to an upper limit value H4 is permitted in order to satisfy a predetermined content relating to basic performance. In regard to the electric power amount demand of the priority rank P5 alone, change in electric power amount in a range of a lower limit value L5 to an upper limit value H5 is permitted in order to satisfy a predetermined content relating to part protection. In regard to the electric power amount demand of the priority rank P6 alone, change in electric power amount in a range of a lower limit value L6 to an upper limit value H6 is permitted in order to satisfy a predetermined content relating to marketability. In regard to the electric power amount demand of the priority rank P7 alone, change in electric power amount in a range of a lower limit value L7 to an upper limit value H7 is permitted in order to satisfy a predetermined content relating to economical efficiency. On the other hand, in regard to the electric power amount demand of the priority rank P8 alone, change in electric power amount is not permitted. Each predetermined content is appropriately set taking into consideration the type of vehicle, performance or a function requested for the vehicle, an influence (merit or demerit) on a vehicle-mounted system or the high-voltage battery 20 due to supply of an electric power amount based on a standard, and the like.

Figure 3B:
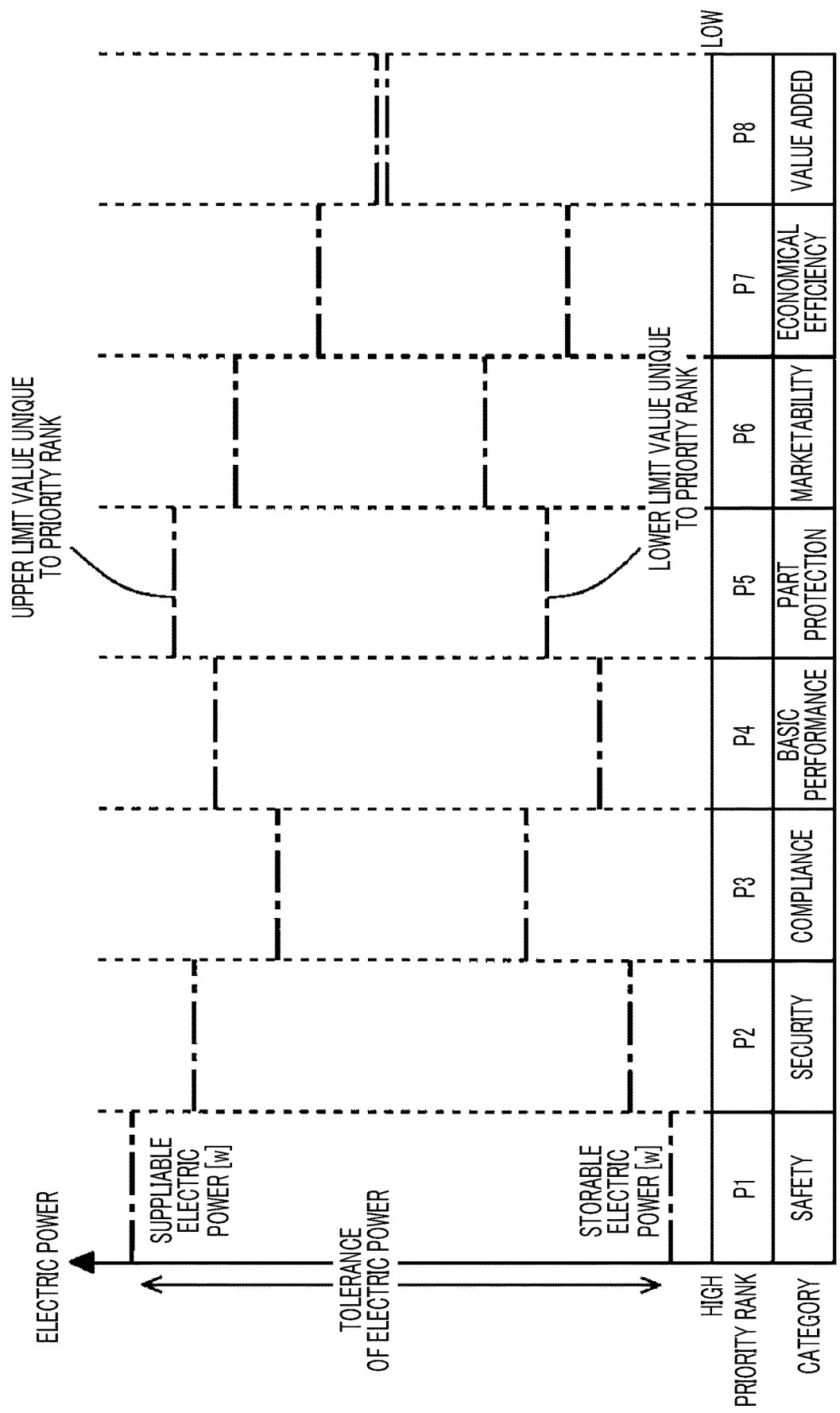
FIG. 3B is an example of a lower limit value and an upper limit value at each priority rank relating to electric power.

The same approach as the above-described electric power amount can be applied to a change range of electric power to be permitted by the high-voltage battery 20 with respect to the demand of each priority rank. FIG. 3B shows an example of an upper limit value and a lower limit value of electric power for which the high-voltage battery 20 can permit a change in electric power with respect to the demand of each priority rank. In this case, the upper limit value becomes a supply limit of electric power suppliable from the supply and storage source, and the lower limit value becomes a storage limit of electric power storable in the supply and storage source.

Figure 4:
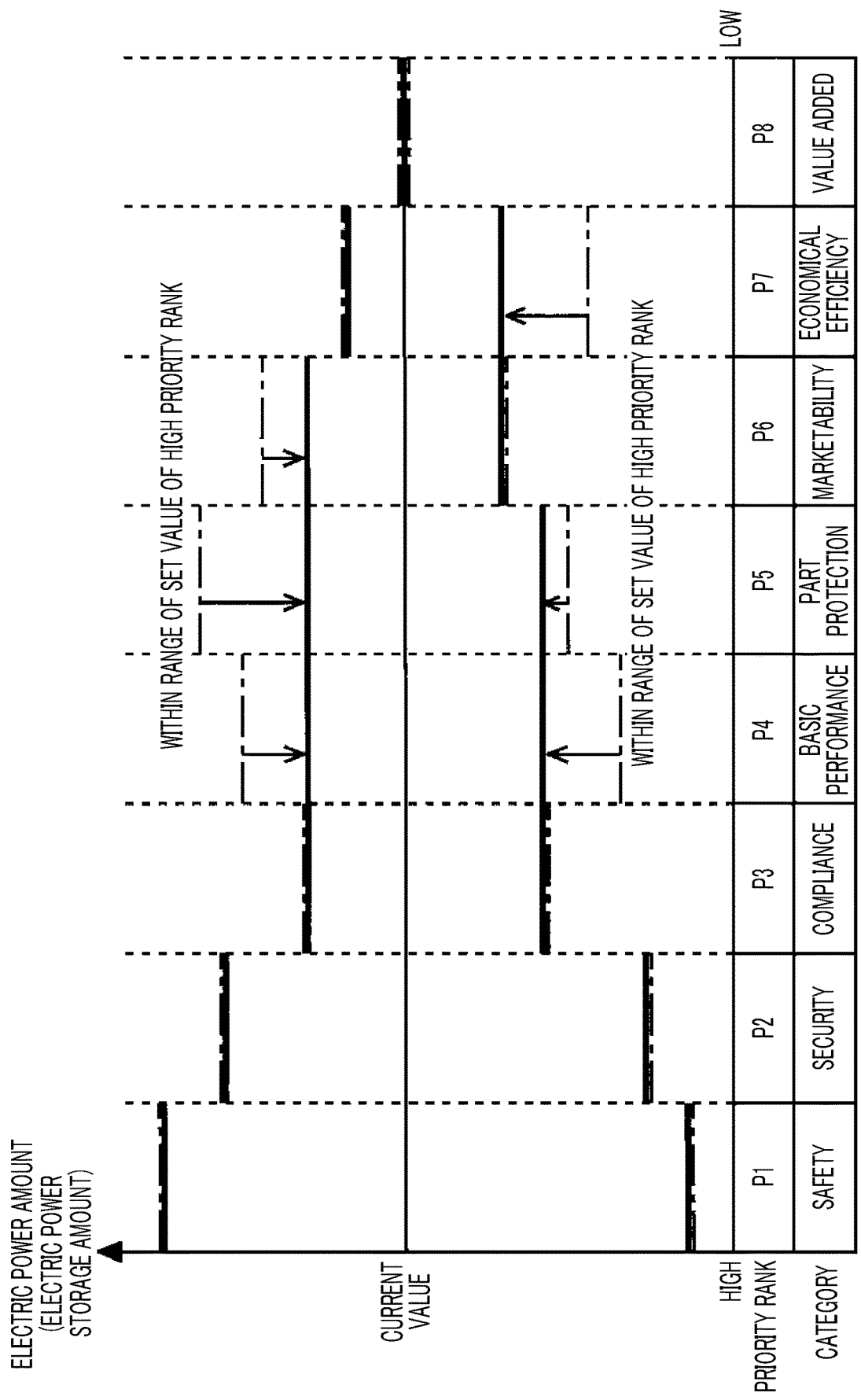
FIG. 4 is an example where a control lower limit value and a control upper limit value of each priority rank are obtained based on FIG. 3A.

After the upper limit value and the lower limit value in each priority rank alone are obtained, a control upper limit value and a control lower limit value of each priority rank for use in allocation control to be executed by the controller 50 are further obtained. The control upper limit value and the control lower limit value are obtained by executing trimming processing within a range of a value set with respect to a higher priority rank based on the unique upper limit value and the unique lower limit value in each priority rank alone. The trimming processing is processing for, when the unique upper limit value in a certain priority rank U alone is greater than the control upper limit value set in a priority rank V with higher priority, restricting the control upper limit value of the priority rank U to the same value as (or a value smaller than) the control upper limit value of the priority rank V. The trimming processing is processing for, when the unique lower limit value in the priority rank U alone is smaller than the control lower limit value set in the priority rank V with higher priority, restricting the control lower limit value of the priority rank U to the same value as (or a value greater than) the control lower limit value of the priority rank V. FIG. 4 shows an example where the control upper limit value and the control lower limit value (thick solid line) of each priority rank are obtained based on the unique upper limit value and the unique lower limit value (one-dot-chain line) in each priority rank alone relating to the electric power amount shown in FIG. 3A.

In FIG. 4, in regard to the highest priority rank P1, the unique upper limit value and the unique lower limit value in the priority rank P1 alone are obtained as the control upper limit value and the control lower limit value of the priority rank P1. In regard to the priority rank P2 with the next priority, a smaller value of the unique upper limit value in the priority rank P2 alone and the control upper limit value set in the priority rank P1 is obtained as the control upper limit value of the priority rank P2, and a greater value of the unique lower limit value in the priority rank P2 alone and the control lower limit value in the priority rank P1 is obtained as the control lower limit value of the priority rank P2. Thus, in regard to the priority rank P2, the upper limit value and the lower limit value in the priority rank P2 alone become the control upper limit value and the control lower limit value. Similarly, in regard to the priority rank P3, the upper limit value and the lower limit value in the priority rank P3 alone become the control upper limit value and the control lower limit value. However, In regard to the priority ranks P4 and P5, since the upper limit value in each priority rank alone is greater than the control upper limit value of the priority rank P3 and the lower limit value in each priority rank alone is smaller than the control lower limit value of the priority rank P3, the control upper limit value and the control lower limit value of the priority rank P3 are obtained as the control upper limit value and the control lower limit value of the priority ranks P4 and P5, respectively (trimming processing). The same approach is also applied to the control upper limit value of the priority rank P6 and the control lower limit value of the priority rank P7. As the control upper limit value and the control lower limit value are obtained according to such a trimming rule, maximum electric power or electric power amount suppliable with respect to demand of a relatively low priority rank is restricted to be equal to or less than maximum electric power or electric power amount suppliable with respect to demand of a relatively high priority rank. As the trimming processing is executed, for example, even though the use of the supply and storage source is restricted in order to satisfy the compliance (priority rank P3), it is possible to avoid execution of control that the basic performance (priority rank P4) uses the supply and storage source beyond the restriction, that is, the basic performance is operated in defiance of the compliance to be preferred.

Figure 5:
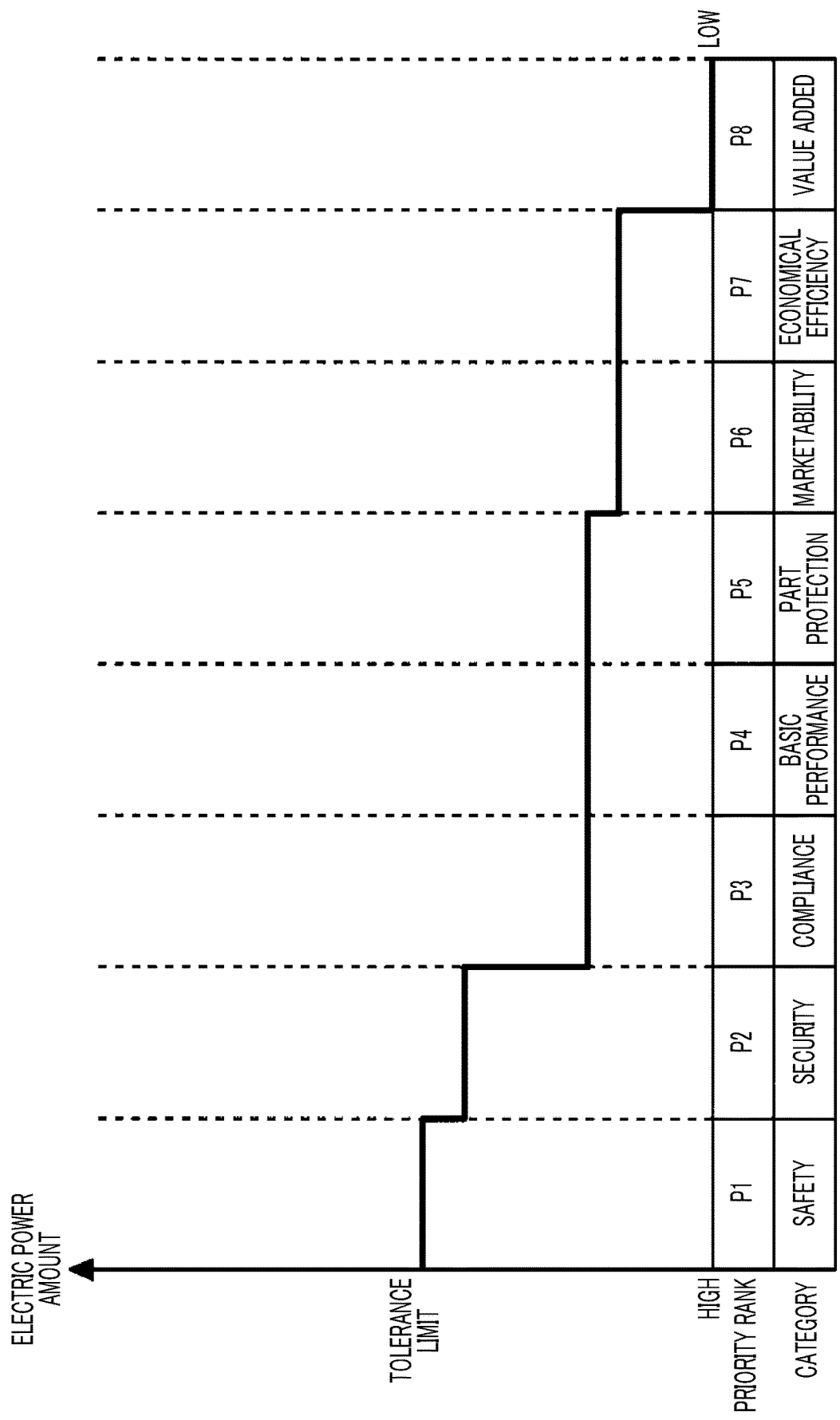
FIG. 5 is an example where a tolerance limit relating to supply of an electric power amount is set based on FIG. 4.

In a case where the control upper limit value and the control lower limit value are obtained, the tolerance limit is set for each priority rank. The tolerance limit is a value indicating an upper limit of electric power or an electric power amount on each priority rank for securing electric power or an electric power amount to be supplied to demand of a different priority rank with higher priority from the own priority rank and for permitting supply to demand of the own priority rank. For example, when the tolerance limit of the priority rank P3 is set to 50 Ws, in a case where the sum of the electric power amount to be supplied to demand of the priority ranks P1 and P2 with higher priority is 40 Ws, supply to 10 Ws (=50–40) is performed with respect to the demand of the priority rank P3; however, in a case where the sum of the electric power amount to be supplied to the demand of the priority ranks P1 and P2 is 60 Ws, since the sum of the electric power amount already exceeds the tolerance limit, supply is not permitted with respect to the demand of the priority rank P3. In regard to the tolerance limit, in a case of the electric power amount shown in FIG. 4, the tolerance limit relating to the supply of the electric power amount can be calculated by "current value−control lower limit value" of the electric power amount. FIG. 5 shows an example where the tolerance limit (solid line) relating to supply of the electric power amount is set based on the current value and the control lower limit value shown in FIG. 4. The tolerance limit relating to the storage of the electric power amount can be calculated by "control upper limit value−current value" based on the current value and the control upper limit value shown in FIG. 4. The tolerance limit relating to the storage of the electric power amount is reflected in setting, for example, the tolerance limit relating to the supply of the electric power amount shown in FIG. 5 can be varied in a direction in which the electric power amount increases, and a tolerance is expanded.

The tolerance limit of each priority rank described above is set for each of the high-voltage battery 20 and the plug-in charger 70. That is, the tolerance limit when the high-voltage battery 20 is set as a supply and storage source with respect to demand and the tolerance limit when the plug-in charger 70 is set as a supply and storage source with respect to demand are set.

The demand calculation unit 51 detects demand for electric power and the like of various priority ranks generated in the pieces of equipment 10 and obtains "total demand" by totaling the detected demand. The demand calculation unit 51 acquires information regarding electric power or the electric power amount requested by the detected demand or the priority rank. The demand calculation unit 51 may receive and acquire the above-described information from the equipment 10 where the demand for electric power and the like is detected or the controller 50 may hold a table, in which the demand for electric power and the like generated in the equipment 10 and the requested electric power or electric power amount or the priority rank are associated with each other, or the like in advance, and the demand calculation unit 51 may acquire the above-described information from the table with the detection of the demand for electric power and the like.

The determination unit 52 determines whether the operation state of the plug-in charger 70 is brought into the drive state in which the supply of electric power and the like to the equipment 10 is performed or the stop state in which the supply of electric power and the like to the equipment 10 is not performed based on electric power or an electric power amount suppliable from the high-voltage battery 20, electric power or an electric power amount suppliable from the plug-in charger 70, the demand generated in the equipment 10 and the total demand, and the tolerance limit of each priority rank.

The state controller 53 controls the operation state of the plug-in charger 70 to either of the drive state or the stop state according to a result of determination in the determination unit 52. The operation state control of the plug-in charger 70 will be described below in detail.

Control

Figure 6A:
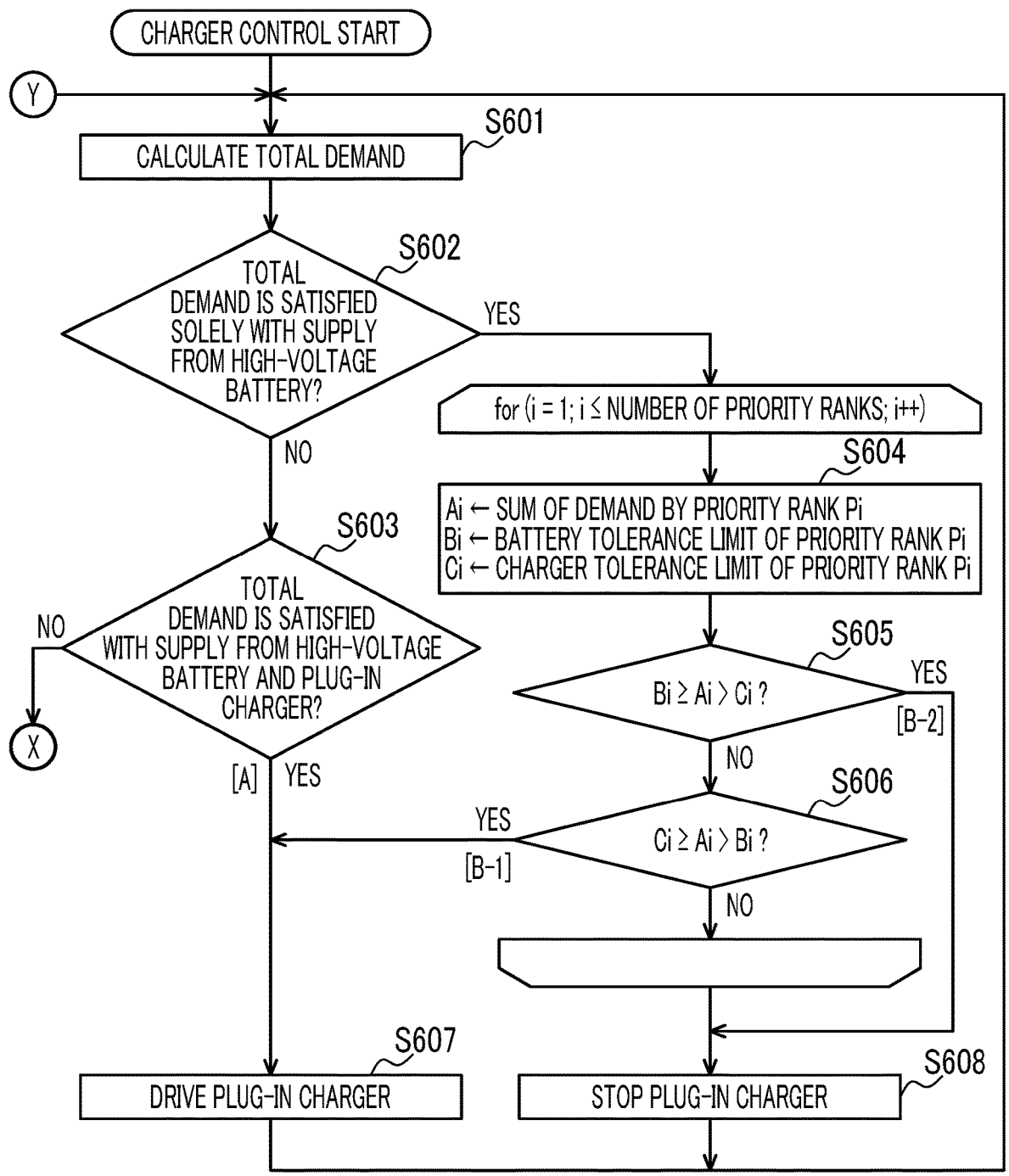
FIG. 6A is a flowchart of charger control that is executed by a controller with respect to demand.
Figure 6B:
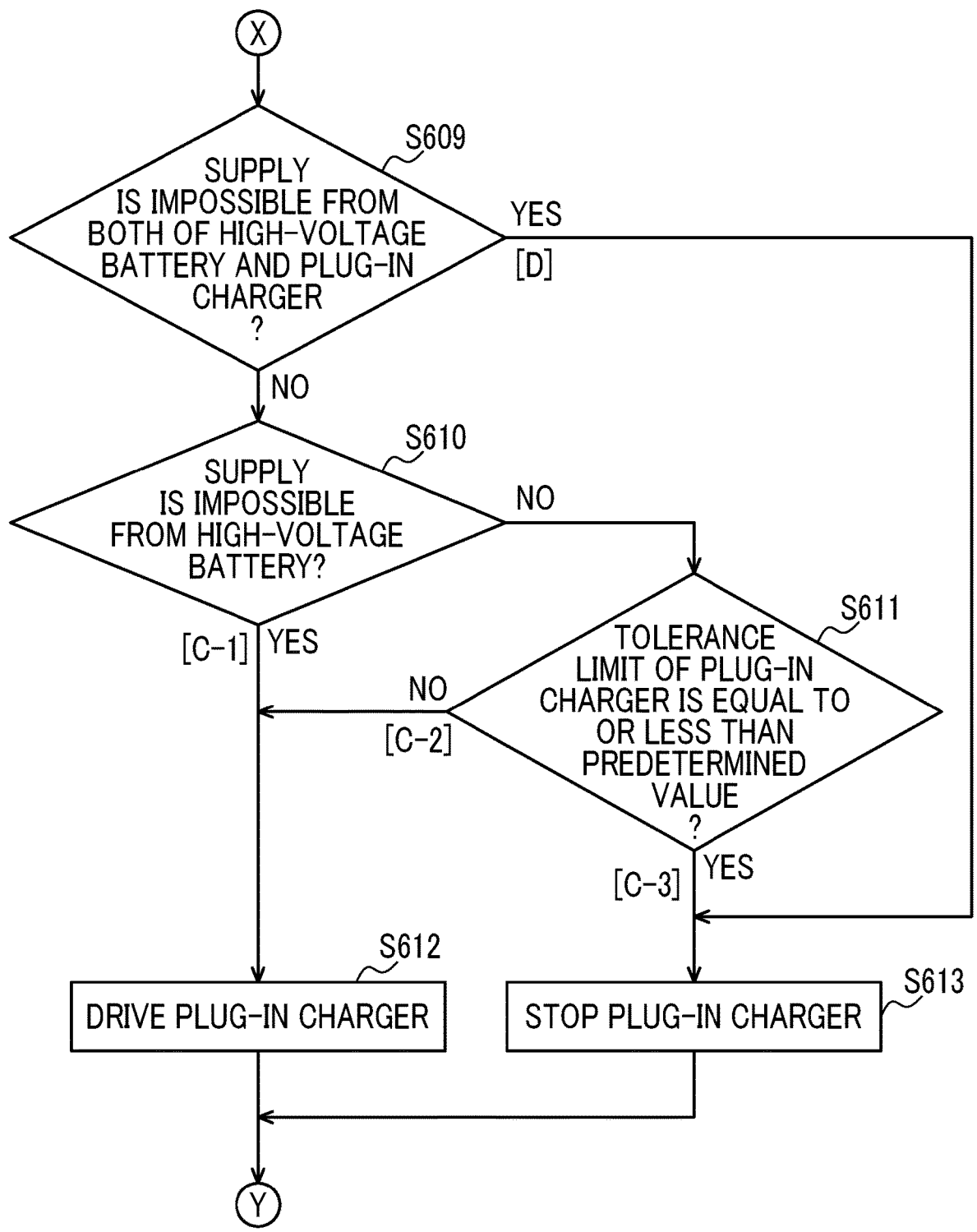
FIG. 6B is a flowchart of charger control that is executed by the controller with respect to demand.

Charger control that is executed by the controller 50 of the demand and supply control system 1 for a vehicle according to the embodiment of the disclosure will be described further referring to the drawings. FIGS. 6A and 6B are flowcharts showing a processing procedure of the charger control that is executed by the controller 50 with respect to demand generated in the equipment 10. Processing of FIG. 6A and processing of FIG. 6B are connected by connectors X and Y. FIGS. 7 to 13 are diagrams illustrating the relationship of the tolerance limit of the high-voltage battery 20, the tolerance limit of the plug-in charger 70, and the total demand, and correspond to processing with parenthesis symbols in FIGS. 6A and 6B.

The charger control shown in FIGS. 6A and 6B is started when the connection plug 72 of the plug-in charger 70 is connected to the external electric power supply 80, and is repeatedly executed until the connection plug is disconnected from the external electric power supply 80.

Step S601: The demand calculation unit 51 calculates the total demand by totaling the demand for electric power and the like generated in the pieces of equipment 10. It is desirable that the total demand is calculated every time, for example, when demand is newly generated or generated demand is vanished and a situation of demand in the vehicle is changed, when a situation of supply of electric power and the like is changed due to the status of the vehicle (the status of high-voltage battery 20, the statuses of various systems, or the like), or the like. The total demand may be calculated at predetermined time intervals. In a case where the total demand is calculated, the process progresses to Step S602.

Step S602: The determination unit 52 determines whether or not the total demand can be satisfied (covered) solely with electric power or the electric power amount suppliable from the high-voltage battery 20. For example, when output electric power of the high-voltage battery 20 is low (low Wout) or a stored electric power amount is short, determination is made that the total demand cannot be satisfied. When the total demand can be satisfied solely with the supply from the high-voltage battery 20 (Step S602, YES), the process progresses to Step S604, and otherwise (Step S602, NO), the process progresses to Step S603.

Step S603: The determination unit 52 determines whether or not the total demand can be satisfied when the electric power or the electric power amount suppliable from the plug-in charger 70 is added to the electric power or the electric power amount suppliable from the high-voltage battery 20. When the total demand can be satisfied with the supply from the high-voltage battery 20 and the plug-in charger 70 (Step S603, YES), the process progresses to Step S607, and otherwise (Step S603, NO), the process progresses to Step S609.

Step S604: The determination unit 52 substitutes the sum of demand to a priority rank Pi into "value Ai". The sum of demand to the priority rank Pi is demand obtained by totaling demand generated in the priority rank Pi and demand generated in priority ranks P(i−1), P(i−2), . . . , P1 higher than the priority rank Pi. The determination unit 52 substitutes a tolerance limit of the high-voltage battery 20 in the priority rank Pi into "value Bi" and substitutes a tolerance limit of the plug-in charger 70 in the priority rank Pi into "value Ci". In a case where the value Ai, the value Bi, and the value Ci are substituted, the process progresses to Step S605.

Step S605: The determination unit 52 determines whether or not a sum Ai of demand is less than a tolerance limit Bi of the high-voltage battery 20 and is equal to or greater than a tolerance limit Ci of the plug-in charger 70 (Bi≥Ai>Ci) on the priority rank Pi. With the determination, it is possible to recognize whether or not there is the priority rank Pi in which the plug-in charger 70 becomes lower in supply capability of electric power and the like than high-voltage battery 20. When Bi≥Ai>Ci (Step S605, YES), the process progresses to Step S608, and otherwise (Step S605, NO), the process progresses to Step S606.

Step S606: The determination unit 52 determines whether or not the sum Ai of demand is less than the tolerance limit Ci of the plug-in charger 70 and is equal to or greater than the tolerance limit Bi of the high-voltage battery 20 (Ci≥Ai>Bi) on the priority rank Pi. With the determination, it is possible to recognize whether or not there is the priority rank Pi in which the plug-in charger 70 becomes higher in supply capability of electric power and the like than the high-voltage battery 20. When Ci≥Ai>Bi (Step S606, YES), the process progresses to Step S607, and otherwise (Step S606, NO), the process progresses to Step S604.

The processing of Steps S604 to S606 described above is executed in a descending order from the highest priority rank, and is continuously executed until the condition of Step S605 or S606 is satisfied in any priority rank or the processing of the lowest priority rank ends. In FIG. 6A, although an example where, when both conditions of Steps S605 and S606 are not satisfied in the processing of all priority ranks, the process progresses to Step S608 has been shown, the process may progress to Step S607.

Step S607: The state controller 53 controls the plug-in charger 70 to the drive state in which the supply of electric power and the like is performed. When the plug-in charger 70 is driven, electric power equal to or less than rated output electric power of the plug-in charger 70 is supplied to each piece of equipment 10 so as not to exceed input electric power Win specified in the high-voltage battery 20. Output electric power Wout specified in the high-voltage battery 20 can be protected through feedback control of the DCDC converter 40. In a case where the control of the plug-in charger 70 ends, the process returns to Step S601.

Figure 7:
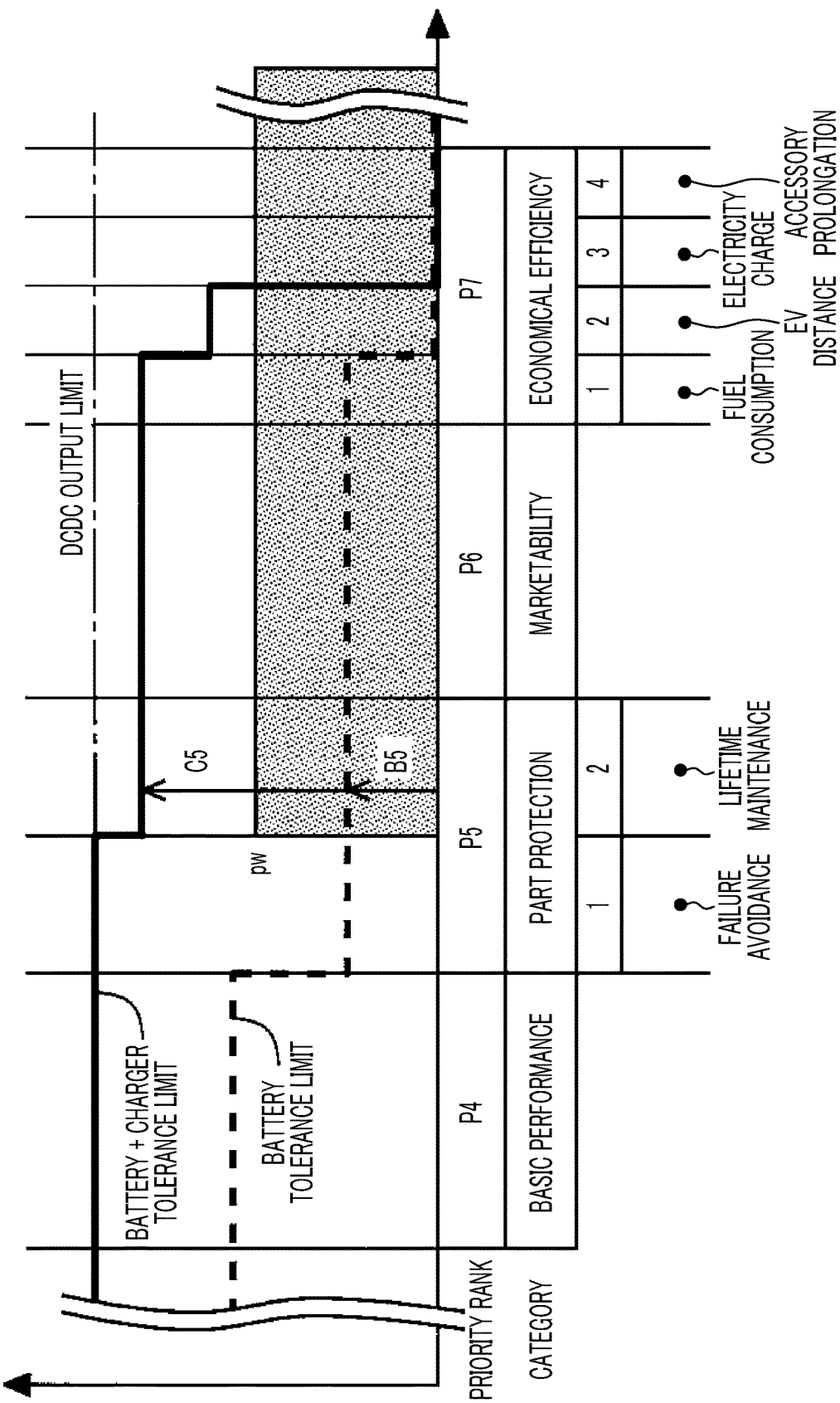
FIG. 7 is a diagram (A pattern) illustrating the relationship between tolerance limits of a high-voltage battery and a plug-in charger and total demand.

FIG. 7 shows a specific example of the relationship between each tolerance limit and the total demand when the total demand can be satisfied with the supply from the high-voltage battery 20 and the plug-in charger 70 [A pattern]. FIG. 7 is an example where electric power demand pw (shaded portion) on the part protection (2 lifetime maintenance) of the priority rank P5 is generated in terms of a demand for drawing electric power. In the A pattern shown in FIG. 7, electric power demand pw of the priority rank P5-2 is not covered with electric power of a tolerance limit B5 of the high-voltage battery 20 (pw>B5), but is covered with electric power of a total tolerance limit obtained by adding a tolerance limit C5 of the plug-in charger 70 to the tolerance limit B5 of the high-voltage battery 20 (pw≤B5+C5). An upper limit of the total tolerance limit obtained by adding the tolerance limit C5 to the tolerance limit B5 is restricted to electric power that can be output from the DCDC converter 40. In a case of the A pattern, the plug-in charger 70 is brought into the drive state.

Figure 8:
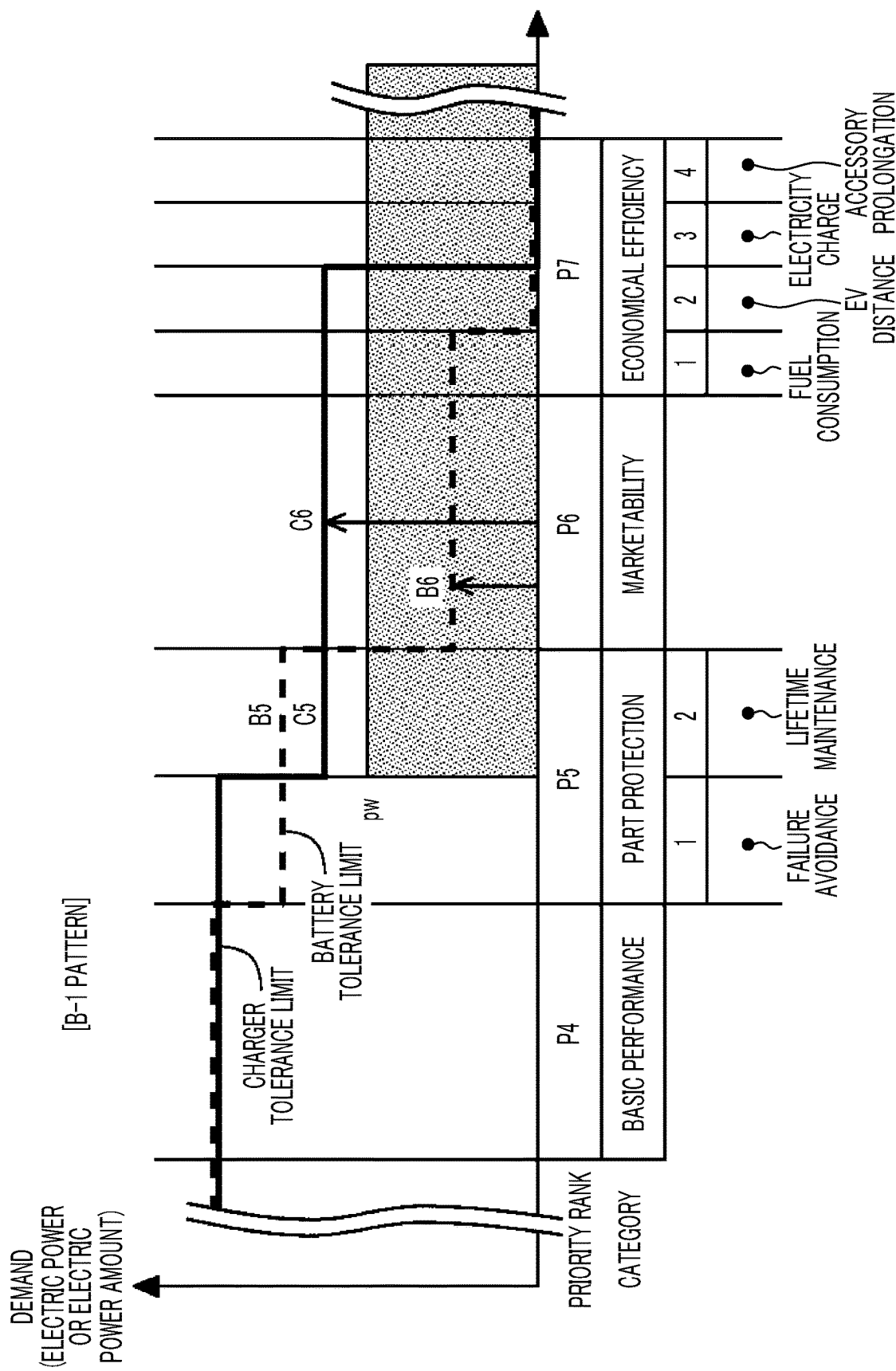
FIG. 8 is a diagram (B-1 pattern) illustrating the relationship between the tolerance limits of the high-voltage battery and the plug-in charger and the total demand.

FIG. 8 shows a specific example of the relationship between each tolerance limit and the total demand when the sum Ai of demand is less than the tolerance limit Ci of the plug-in charger 70 and is equal to or greater than the tolerance limit Bi of the high-voltage battery 20 (Ci≥Ai>Bi) [B-1 pattern]. FIG. 8 is an example where demand pw (shaded portion) for electric power or an electric power amount on the part protection (2 lifetime maintenance) of the priority rank P5 is generated in terms of a demand for drawing electric power. In the B-1 pattern shown in FIG. 8, the demand pw of the priority rank P5-2 is covered with the tolerance limit B5 of the high-voltage battery 20 or the tolerance limit C5 of the plug-in charger 70. However, in regard to the priority rank P6, while a tolerance limit B6 of the high-voltage battery 20 falls below the demand pw, a tolerance limit C6 of the plug-in charger 70 exceeds the demand pw. In a case of the B-1 pattern, even though the demand of the priority rank P6 is generated hereafter, the plug-in charger 70 is brought into the drive state such that at least a part of the demand can be covered. With this, for example, it is possible to restrain information for transmitting a decrease in EV traveling distance giving a user a sense of discomfort from being displayed on a display (marketability) or a decrease in SOC due to discharging of the high-voltage battery 20 without control (economical efficiency).

Step S608: The state controller 53 controls the plug-in charger 70 to the stop state in which the supply of electric power and the like is not performed. In a case where the control of the plug-in charger 70 ends, the process returns to Step S601.

Figure 9:
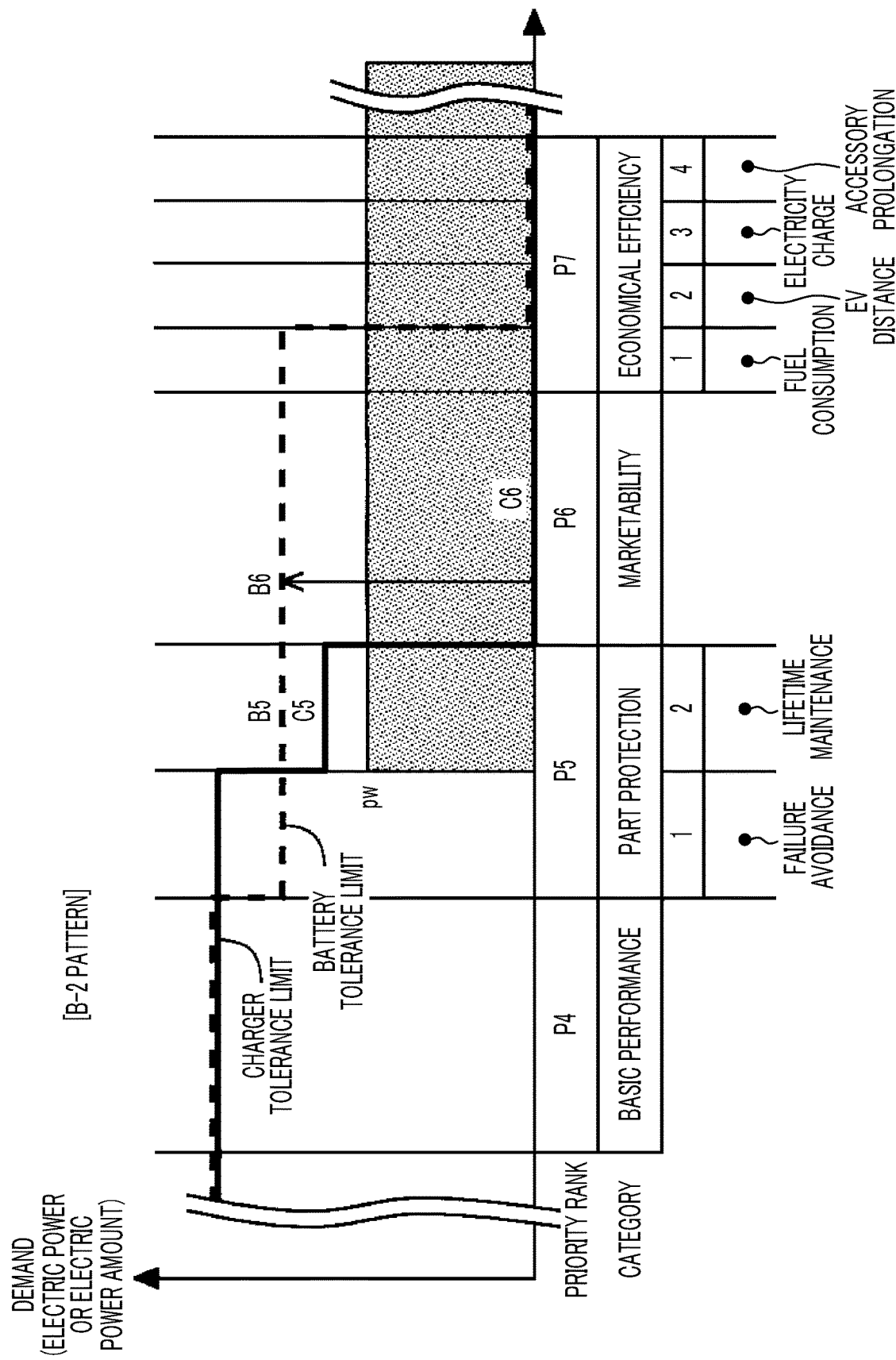
FIG. 9 is a diagram (B-2 pattern) illustrating the relationship between the tolerance limits of the high-voltage battery and the plug-in charger and the total demand.

FIG. 9 shows a specific example of the relationship between each tolerance limit and the total demand when the sum Ai of demand is less than the tolerance limit Bi of the high-voltage battery 20 and is equal to or greater than the tolerance limit Ci of the plug-in charger 70 (Bi≥Ai>Ci) [B-2 pattern]. FIG. 9 is an example where demand pw (shaded portion) for electric power or an electric power amount on the part protection (2 lifetime maintenance) of the priority rank P5 is generated in terms of a demand for drawing electric power. In the B-2 pattern shown in FIG. 9, demand pw of the priority rank P5-2 is covered with the tolerance limit B5 of the high-voltage battery 20 or the tolerance limit C5 of the plug-in charger 70. However, in regard to the priority rank P6, while the tolerance limit B6 of the high-voltage battery 20 exceeds the demand pw, the tolerance limit C6 of the plug-in charger 70 falls below the demand pw. In a case of the B-2 pattern, the plug-in charger 70 is brought into the stop state such that unneeded electric power of the plug-in charger 70 is not consumed. With this, for example, it is possible to restrain the high-voltage battery 20 from being charged to full charge capacity without control (part protection), an excess of the input electric power Win of the high-voltage battery 20 (part protection), information for transmitting an increase in EV traveling distance giving the user a sense of discomfort from being displayed on the display (marketability), or an increase in electricity charge (economical efficiency).

Step S609: The determination unit 52 determines whether or not the supply of electric power and the like is impossible from both of the high-voltage battery 20 and the plug-in charger 70. That is, determination is made whether both of the high-voltage battery 20 and the plug-in charger 70 cannot supply electric power and the like with respect to the demand for electric power and the like generated in the pieces of equipment 10 or at least one of the high-voltage battery 20 and the plug-in charger 70 can supply electric power and the like. When the supply of electric power and the like is impossible from both of the high-voltage battery 20 and the plug-in charger 70 (Step S609, YES), the process progresses to Step S613, and otherwise (Step S609, NO), the process progresses to Step S610.

Step S610: The determination unit 52 determines whether or not the supply of electric power and the like is impossible from the high-voltage battery 20. When the supply from the high-voltage battery 20 is impossible (Step S610, YES), since the plug-in charger 70 can supply electric power and the like, the process progresses to Step S612, and otherwise (Step S610, NO), the process progresses to Step S611.

Step S611: The determination unit 52 determines whether or not the tolerance limit of the plug-in charger 70 is equal to or less than a predetermined value in a priority rank in which demand is generated. The determination is performed in order to determine whether or not it is efficient to drive the plug-in charger 70, and the predetermined value is appropriately set based on efficiency or the like requested for a system. When the tolerance limit of the plug-in charger 70 is equal to or less than the predetermined value (Step S611, YES), since it is not efficient to drive the plug-in charger 70, the process progresses to Step S613, and otherwise (Step S611, NO), the process progresses to Step S612.

Step S612: The state controller 53 controls the plug-in charger 70 to the drive state in which the supply of electric power and the like is performed. When the plug-in charger 70 is driven, electric power equal to or less than the rated output electric power of the plug-in charger 70 is supplied to each piece of equipment 10 so as not to exceed the input electric power Win specified in the high-voltage battery 20. The output electric power Wout specified in the high-voltage battery 20 can be protected through the feedback control of the DCDC converter 40. In a case where the control of the plug-in charger 70 ends, the process returns to Step S601.

Figure 10:
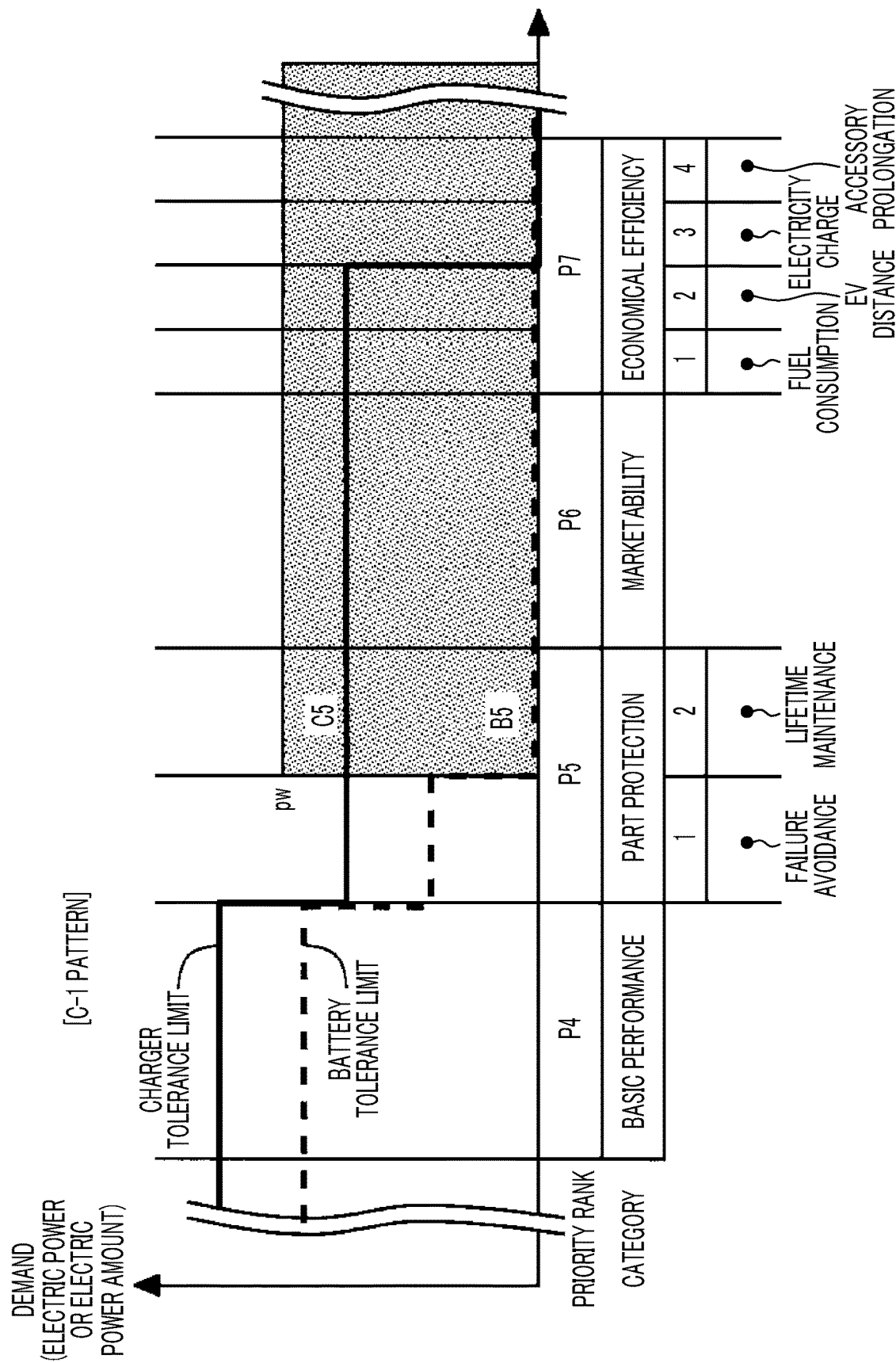
FIG. 10 is a diagram (C-1 pattern) illustrating the relationship between the tolerance limits of the high-voltage battery and the plug-in charger and the total demand.

FIG. 10 shows a specific example of the relationship between each tolerance limit and the total demand when the supply of electric power and the like from the high-voltage battery 20 is impossible [C-1 pattern]. FIG. 10 is an example where electric power demand pw (shaded portion) on the part protection (2 lifetime maintenance) of the priority rank P5 is generated in terms of a demand for drawing electric power. In the C-1 pattern shown in FIG. 10, the electric power demand pw of the priority rank P5-2 is not covered with electric power of the total tolerance limit obtained by adding the tolerance limit B5 of the high-voltage battery 20 and the tolerance limit C5 of the plug-in charger 70 (pw>B5+C5) and is not covered with the high-voltage battery 20 at all (pw>B5=0), but is partially covered with the plug-in charger 70 (pw>C5≠0). In a case of the C-1 pattern, the plug-in charger 70 is brought into the drive state. With this, even though electric power and the like cannot be supplied from the high-voltage battery 20, electric power and the like can be supplied from the plug-in charger 70.

Figure 11:
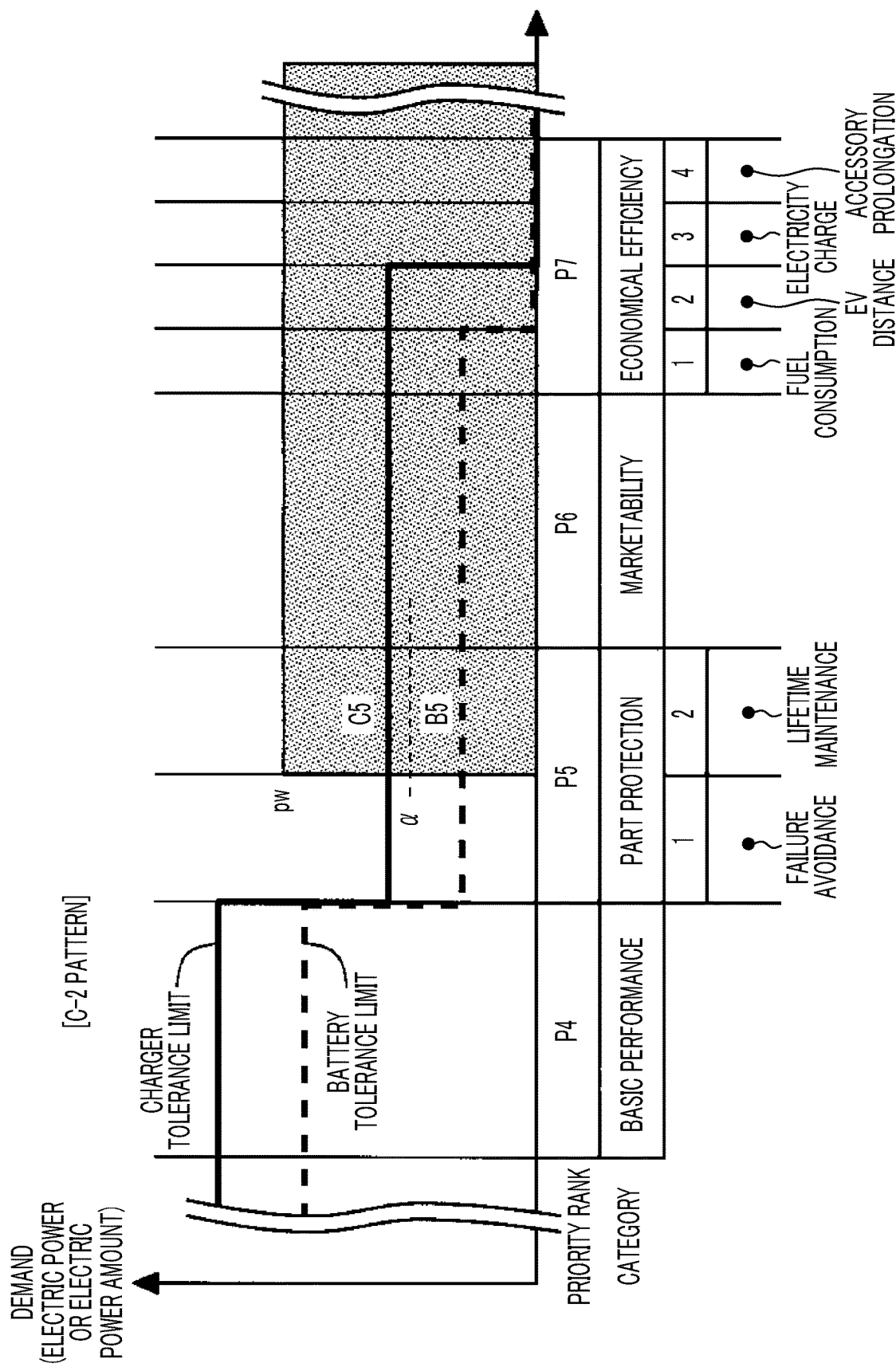
FIG. 11 is a diagram (C-2 pattern) illustrating the relationship between the tolerance limits of the high-voltage battery and the plug-in charger and the total demand.

FIG. 11 shows a specific example of the relationship between each tolerance limit and the total demand when the tolerance limit of the plug-in charger 70 exceeds the predetermined value [C-2 pattern]. FIG. 11 is an example where electric power demand pw (shaded portion) on the part protection (2 lifetime maintenance) of the priority rank P5 is generated in terms of a demand for drawing electric power. In the C-2 pattern shown in FIG. 11, the electric power demand pw of the priority rank P5-2 is not covered with the electric power of the total tolerance limit obtained by adding the tolerance limit B5 of the high-voltage battery 20 and the tolerance limit C5 of the plug-in charger 70 (pw>B5+C5), and the tolerance limit C5 of the plug-in charger 70 is greater than a predetermined value α (C5>α). In a case of the C-2 pattern, the plug-in charger 70 is brought into the drive state. With this, it is possible to supply more electric power compared to a case where solely the high-voltage battery 20 is used.

Step S613: The state controller 53 controls the plug-in charger 70 to the stop state in which the supply of electric power and the like is not performed. In a case where the control of the plug-in charger 70 ends, the process returns to Step S601.

Figure 12:
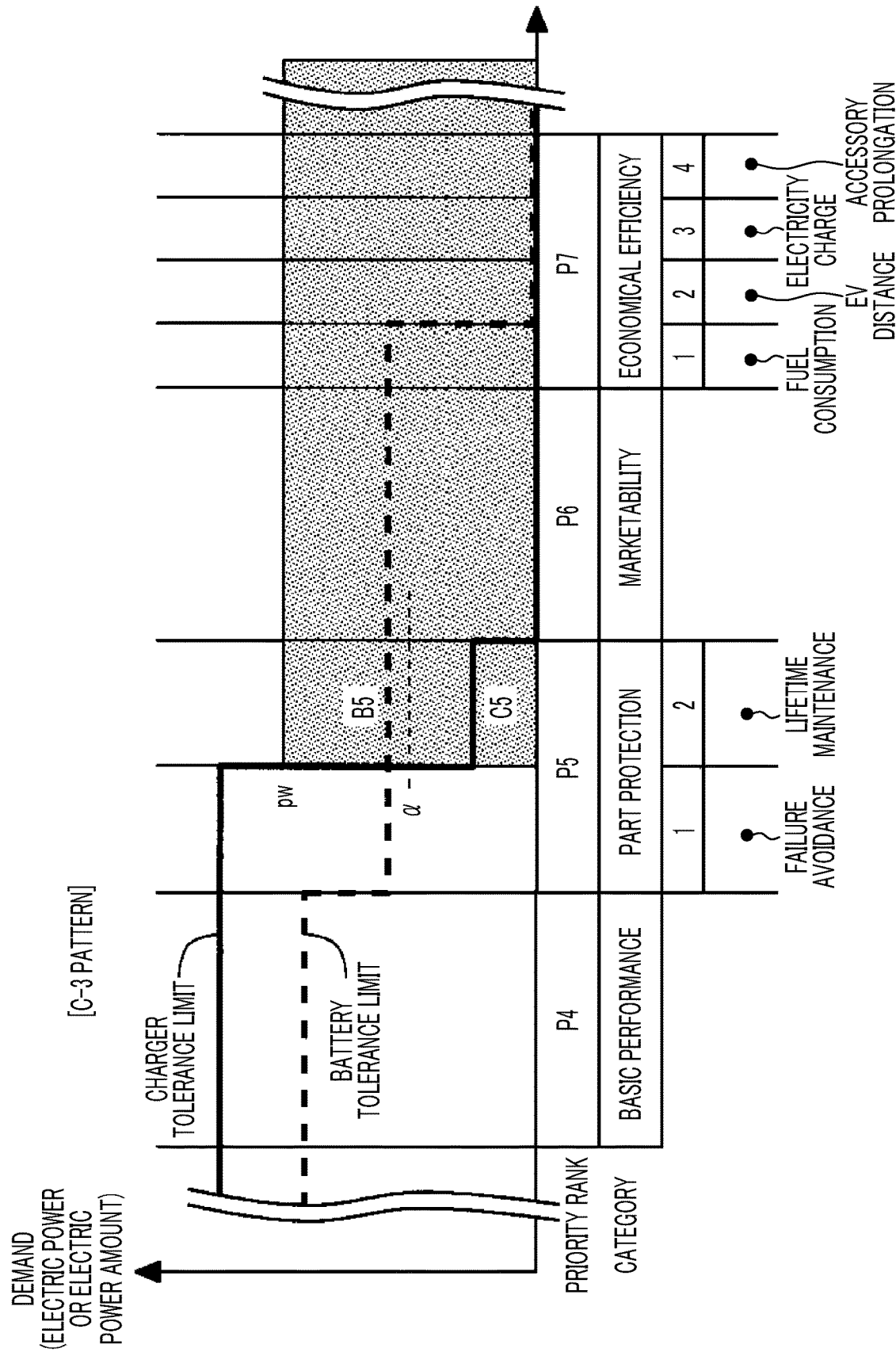
FIG. 12 is a diagram (C-3 pattern) illustrating the relationship between the tolerance limits of the high-voltage battery and the plug-in charger and the total demand.

FIG. 12 shows a specific example of the relationship between each tolerance limit and the total demand when the tolerance limit of the plug-in charger 70 is equal to or less than the predetermined value [C-3 pattern]. FIG. 12 is an example where electric power demand pw (shaded portion) on the part protection (2 lifetime maintenance) of the priority rank P5 is generated in terms of a demand for drawing electric power. In the C-3 pattern shown in FIG. 12, the electric power demand pw of the priority rank P5-2 is not covered with electric power of the total tolerance limit obtained by adding the tolerance limit B5 of the high-voltage battery 20 and the tolerance limit C5 of the plug-in charger 70 (pw>B5+C5), and the tolerance limit C5 of the plug-in charger 70 is smaller than the predetermined value α (C5<α). In a case of the C-3 pattern, the plug-in charger 70 is brought into the stop state. With this, it is possible to restrain degradation of system efficiency due to the drive of the plug-in charger 70.

FIG. 13 shows a specific example of the relationship between each tolerance limit and the total demand when the supply of electric power and the like is impossible from both of the high-voltage battery 20 and the plug-in charger 70 [D pattern]. FIG. 13 is an example where electric power demand pw (shaded portion) of the part protection (2 lifetime maintenance) of the priority rank P5 is generated in terms of a demand for drawing electric power. In the D pattern shown in FIG. 13, since the tolerance limit of the priority rank P5-2 is zero in both of the high-voltage battery 20 and the plug-in charger 70, the electric power demand pw of the priority rank P5-2 is not covered. Thus, the plug-in charger 70 is stopped, whereby it is possible to eliminate unneeded electric power consumption.

Advantageous Effects

As described above, with the demand and supply control system 1 for a vehicle according to the embodiment of the disclosure, in a scene where the high-voltage battery 20 and the plug-in charger 70 are used in combination as the supply and storage source of electric power or the electric power amount to the equipment 10, when the total demand generated in the equipment 10 is not completely covered solely with electric power or the electric power amount from the high-voltage battery 20, the plug-in charger 70 is driven in a case where the total demand is covered by adding the supply of electric power or the electric power amount from the plug-in charger 70. With this, it is possible to suitably use electric power or the electric power amount to be supplied from the plug-in charger 70 connected to the external electric power supply 80 with respect to the demand for electric power or the electric power amount generated in the equipment 10.

With the demand and supply control system 1 for a vehicle according to the embodiment, when the total demand generated in the equipment 10 is completely covered solely with the supply of electric power or the electric power amount from the high-voltage battery 20, determination about whether to drive or to stop the plug-in charger 70 is performed based on the tolerance limits given to a plurality of priority ranks for classifying the demand for electric power or the electric power amount generated in the equipment 10. With this, it is possible to more suitably use electric power or the electric power amount to be supplied from the plug-in charger 70 connected to the external electric power supply 80 with respect to the demand for electric power or the electric power amount generated in the equipment 10.

With the demand and supply control system 1 for a vehicle according to the embodiment, even though the total demand generated in the equipment 10 is not completely covered solely with the supply of electric power or the electric power amount from the high-voltage battery 20, the plug-in charger 70 is driven in a case where the sum of demand in any priority rank is less than the tolerance limit of the plug-in charger 70 and is equal to or greater than the tolerance limit of the high-voltage battery 20. With this, it is possible to supply more electric power or a more electric power amount with respect to the demand generated in the priority rank.

With the demand and supply control system 1 for a vehicle according to the embodiment, when the total demand generated in the equipment 10 is not covered solely with the supply of total electric power or a total electric power amount suppliable from the high-voltage battery 20 and the plug-in charger 70, the plug-in charger 70 is driven in a case where the supply of electric power from the high-voltage battery 20 is possible and the drive of the plug-in charger 70 is efficient. With this, it is possible to efficiently supply electric power or the electric power amount from the plug-in charger 70 with respect to more demand.

Although the embodiment of the disclosure has been described, the disclosure can be regarded as a control device, a demand and supply control system including the control device, a charger control method that is executed by the demand and supply control system, a charger control program, a computer-readable non-transitory recording medium storing the program, or a vehicle mounted with the demand and supply control system.

The demand and supply control system for a vehicle of the disclosure is usable in a vehicle or the like in which a battery as a supply and storage source of electric power or the electric power amount is mounted.

What is claimed is:

1. A demand and supply control system for a vehicle that is mounted in a vehicle and controls demand and supply of electric power or an electric power amount in the vehicle, the demand and supply control system comprising:
    an in-vehicle battery;
    a charger configured to perform supply of electric power from an external electric power supply connected to the charger to one or more pieces of in-vehicle equipment; and
    a control device configured to control the in-vehicle battery and the charger,
    wherein the control device is configured to
        obtain total demand as a sum of demand for electric power or an electric power amount generated in the one or more pieces of in-vehicle equipment during parking,
        determine whether or not the total demand is able to be satisfied with electric power or an electric power amount suppliable from the in-vehicle battery,
        when the total demand is not able to be satisfied solely with the in-vehicle battery, control the charger to a drive state in a case where the total demand is able to be satisfied with total electric power or a total electric power amount suppliable from the in-vehicle battery and the charger,
        when the total demand is able to be satisfied solely with the in-vehicle battery, for each of a plurality of priority ranks set in each of the in-vehicle battery and the charger and defined in advance to classify the demand for electric power or the electric power amount generated in the one or more pieces of in-vehicle equipment, control the charger to either of the drive state, in which the supply of electric power to the in-vehicle equipment is performed, or a stop state, in which the supply of electric power to the in-vehicle equipment is not performed, based on a tolerance limit indicating an upper limit of electric power or an electric power amount for securing electric power or an electric power amount to be supplied with respect to demand of a higher priority rank within a range of a value set for the higher priority rank and for permitting supply to demand of the own priority rank, and in at least one of the priority ranks, bring the charger into the drive state in a case where a sum of demand as a sum of demand generated in the own priority rank and demand generated in a priority rank higher than the own priority rank is less than a tolerance limit of the charger and is equal to or greater than a tolerance limit of the in-vehicle battery, and bring the charger into the stop state in a case where the sum of demand is less than the tolerance limit of the in-vehicle battery and is equal to or greater than the tolerance limit of the charger.

2. The demand and supply control system according to claim 1, wherein the control device is configured to, when the total demand is not able to be satisfied solely with the in-vehicle battery, control the charger to the drive state in a case where the total demand is not able to be satisfied with the total electric power or the total electric power amount suppliable from the in-vehicle battery and the charger, and supply of electric power from the in-vehicle battery is impossible in at least one of the priority ranks.

3. The demand and supply control system according to claim 1, wherein the control device is configured to, when the total demand is not able to be satisfied solely with the in-vehicle battery, in a case where the total demand is not able to be satisfied with the total electric power or the total electric power amount suppliable from the in-vehicle battery and the charger, and supply of electric power from the in-vehicle battery is possible, control the charger to the drive state when the tolerance limit of the charger is greater than a predetermined value in a priority rank in which demand is generated, and control the charger to the stop state when the tolerance limit of the charger is smaller than the predetermined value in the priority rank in which demand is generated.

* * * * *